United States Patent [19]

Jobst

[11] Patent Number: 4,699,322
[45] Date of Patent: Oct. 13, 1987

[54] AIR DISCHARGE NOZZLE FOR AIR DELIVERY SYSTEMS

[75] Inventor: Wolfgang Jobst, Nauheim, Fed. Rep. of Germany

[73] Assignee: General Motors Corporation, Detroit, Mich.

[21] Appl. No.: 864,328

[22] Filed: May 19, 1986

[30] Foreign Application Priority Data

Aug. 16, 1985 [DE] Fed. Rep. of Germany ....... 3529463

[51] Int. Cl.$^4$ ............................ B05B 1/26; B60H 1/00; F24F 7/00
[52] U.S. Cl. .................................. 239/503; 239/513; 98/2; 98/40.24
[58] Field of Search ............... 239/502, 503, 512, 513; 98/2, 40.02, 40.24, 40.26, 40.28

[56] References Cited

U.S. PATENT DOCUMENTS 2,625,874  1/1953  Kennedy ........................... 98/40.26
2,895,401  7/1959  Goettl ............................. 98/40.26 X
3,736,858  6/1973  Mercier ............................. 98/40.02
4,607,565  8/1986  Sugarawa ........................... 98/40.24

FOREIGN PATENT DOCUMENTS 2114297   9/1971  Fed. Rep. of Germany .
7318689   5/1973  Fed. Rep. of Germany .
100536   12/1940  Switzerland ...................... 98/40.24

Primary Examiner—Andres Kashnikow
Assistant Examiner—Patrick N. Burkhart
Attorney, Agent, or Firm—R. L. Phillips

[57] ABSTRACT

An air discharge nozzle for ventilating and air conditioning systems and the like is disclosed having directional strips that are disposed pivotably in the discharge jet and are adjustable for directional control of outflow. The arrangement is such that the air can flow through only between any two strips and accordingly, only those partial discharge currents that are oriented by means of the strips are produced.

11 Claims, 4 Drawing Figures

AIR DISCHARGE NOZZLE FOR AIR DELIVERY SYSTEMS

TECHNICAL FIELD

This invention relates to an air discharge nozzle for air delivery systems such as the ventilating and air conditioning systems used in motor vehicles, and more particularly to such a nozzle that includes jalousie-type louvers that are arranged adjacent one another in the nozzle opening and adapted for pivoting movement, each of the pivoting axes of the louvers extending substantially transversely to the direction of air flow, and with the pivot pins of the louvers being coupled to one another by a common drive means, so that the air exiting from the air discharge nozzle can be diverted, depending on the respective pivoting position of the louvers, into various directions relative to the axis of the nozzle opening.

BACKGROUND OF THE INVENTION

Arrangements of this type are described, for instance, in German Utility Pat. No. DE-GM 73 18 689 for the air outlets of air conditioning systems. In such arrangements, the effectiveness of the air deflecting louvers is somewhat limited inasmuch as the air traveling through the portion of the nozzle between the outermost louvers and the nozzle wall is either not deflected at all, or is deflected only to a limited extent, into the direction corresponding to the pivoting position of the air deflecting blades, with the result that non-directed marginal air currents are created. This, in turn, causes the air currents between two respective air deflecting blades to be partially redirected from the desired flow path.

In German Auslegesschrift No. DE-AS 21 14 297, the air deflecting blades are in the form of stationary elements that are arranged inside barrel-shaped rotatable bodies, and these rotatable bodies are accommodated in respective chambers that form the air discharge nozzles. The rotatable bodies can be adjusted so as to assume various pivoting positions enabling the air exiting from the discharge nozzle to be deflected into the desired direction. Furthermore, pairs comprised of two adjacent air deflecting blades are arranged inside the rotatable body so as to form a funnel-like patterns, the arrangement being such that each such pair of blades forms an air duct in which the cross-sectional area of the duct diminishes from one end to the other end of the duct. Accordingly, the cross-sectional areas of the inlet and outlet openings of the rotational body differ in size. This arrangement enables production at the outlet of the nozzle of converging or diverging air currents, depending on whether the smaller or larger cross-sectional area is disposed on the outlet end. Furthermore, the arrangement is such that large pivoting movements of the rotational body change the pattern of the air currents exiting from the discharge nozzle, whereas smaller pivoting movements only cause the air currents to change direction.

In this prior art arrangement, no non-directed marginal air currents are produced because the passages through which the lateral air currents are directed are defined, respectively, by one air deflecting blade and one wall portion of the rotatable body, so that when the rotatable body is moved into a different position, the pivoting movement of the wall portion of the rotatable body is the same as that of the air deflecting blade. However, in comparison to discharge nozzles with individually pivotable air deflecting blades, as described earlier, this arrangement requires a considerably larger volume of space if air currents of large cross-sectional areas are to be controlled.

SUMMARY OF THE INVENTION

An object of the present invention is to provide an air discharge nozzle of the type described in the foregoing in which non-directed marginal air currents are eliminated, and effective directional control of the air currents is enabled.

According to the present invention, regardless of the respective position of the outer air deflecting blades, the marginal cross-sectional areas of the air discharge nozzle opening disposed on those sides of the outer air deflecting blades that are facing away from the other air deflecting blades are blocked off.

Thus, the invention is based on the general concept of providing an air discharge nozzle in which the air is permitted to travel only between the air deflecting blades. The advantage of this arrangement, in terms of flow-technological considerations, is that when the air deflecting blades are simultaneously and uni-directionally adjusted into position, the opening cross-sections on the inlet and outlet side of the air deflecting blade arrangement remain substantially unchanged.

In accordance with a preferred embodiment, the sides of the outermost air deflecting blades which are facing each other from, when viewed in axial direction, a funnel. By having the funnel conically converge in the axial direction, the effectiveness of the air deflecting blades is enhanced, because the air traveling through the air deflecting blade arrangement, due to the narrowing of the cross section, is somewhat accelerated, especially in the marginal zones. Another advantage of this acceleration effect is that non-directed partial air currents, which may be generated on account of leakages or the like, are hardly capable of diverting the directed air currents from their desired flow path.

In order to obtain a laminar flow characteristic, it is preferable that the sides of the outer air deflecting blades that are facing each other have an arcuate or angular profile, as viewed in axial direction, the arrangement being such that a funnel is formed wherein the portion extending from the inwardly tapered end is of constant cross section.

Preferably, the partial cross sections outside of the outer air directing blades are blocked off in that the nozzle wall opposite the outer side of the outermost air deflecting blades is provided with wall portions that are of arcuate profile configuration, the arrangement being such that the center of the arc coincides with the pivot axis of the adjacent outer air deflecting blade, and in that on each of the outermost air deflecting blades there is arranged a sealing element, e.g., a drum-like segment or sealing web, that extends up to the adjacent wall portion.

Also according to a preferred arrangement, each of the outer air deflecting blades is comprised of two portions that are interconnected in the region of the pivot axis of the air deflecting blade so as to form an arc or an obtuse angle that is open towards the adjacent wall portion. Moreover, each blade portion is provided with marginal edges that conform to the shape of the adjacent wall portions and are suitably spaced therefrom, so that regardless of the pivot position of the outer air deflecting blade, one or the other blade portion will interact with the wall portion and thereby assume the sealing function. Like the other regular air deflecting blades, the outer air deflecting blades are thin-walled members made of a plastic material, which may be manufactured in a simple manner, i.e., they need not be made by the injection molding technique.

If desired, fixed air deflecting blades may be provided and arranged transversely to the pivot axes of the pivotable air deflecting blades, and the arrangement may be such that each of the pivotable air deflecting blades is comprised of several portions that are interconnected by means of the pivot shaft and disposed in the respective nozzle partitions that are formed by the fixed air deflecting blades. The pivot shaft may be arranged so as to extend through slots or openings which are provided in the fixed air deflecting blades and may also assume the function of an intermediate bearing means for the pivot shaft between the segments of the air deflecting blades.

It is desirable, especially if the air deflecting blades, which are interconnected for simultaneous adjustment, are arranged so that the open cross section between two respective air deflecting blades increases or decreases in the direction of air flow, that the air deflecting blades be accommodated in a body whose pivoting axis extends perpendicularly to the direction of air flow so that when the rotatable body is adjusted into certain positions there can be generated on the outlet side of the discharge nozzle a diverging or converging flow, i.e. a relatively intense air current, depending on whether the cross section of the air current is expanding or contracting in the direction of air flow.

If the axis of rotation of the rotatable body extends perpendicularly to the pivoting axes of the air deflecting blades, the exiting beam of air may be directed upwardly or sidewards by either making adjustments in the position of the rotatable body or the air deflecting blades.

These and other characteristic features, objects and advantages of the present invention will become more apparent from the following description of several exemplary embodiments taken in conjunction with the accompanying drawings wherein:

DESCRIPTION OF THE EXAMPLARY EMBODIMENTS

Figure 1:
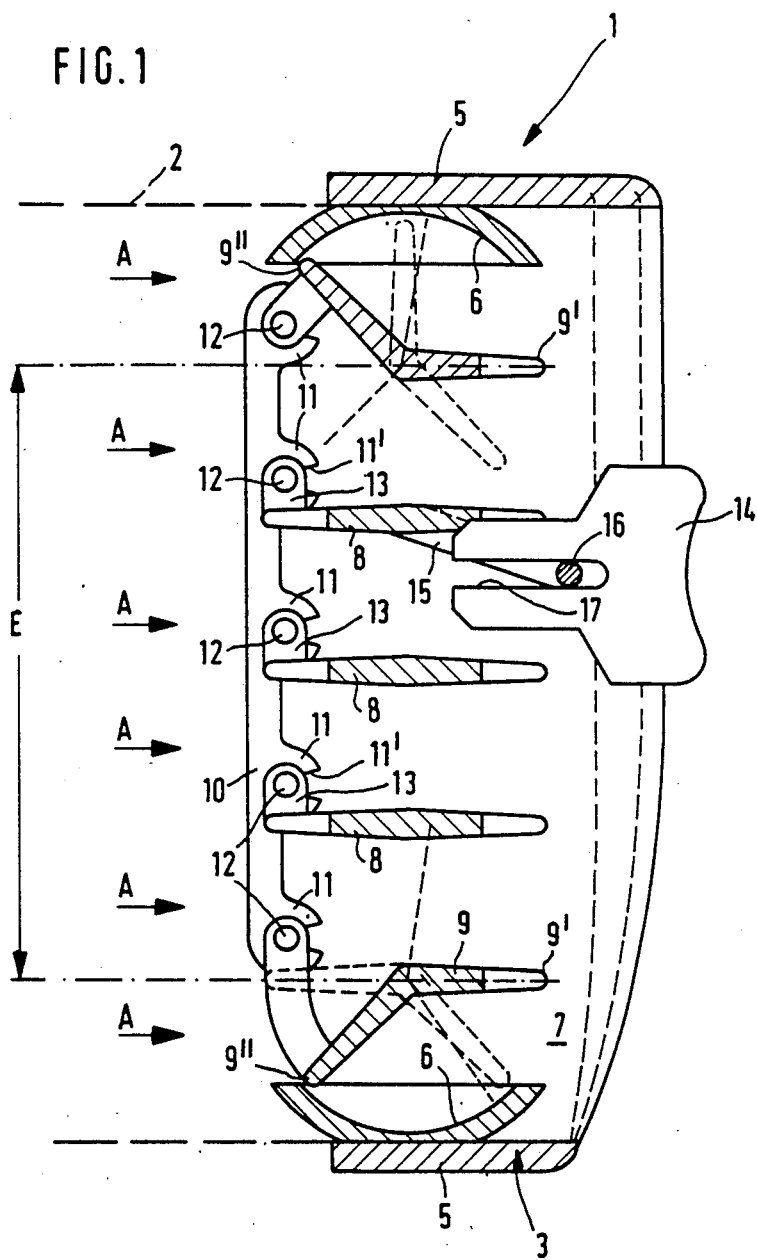
FIG. 1 is an axial section of an air discharge nozzle according to the invention for use in a ventilating and air conditioning system in a motor vehicle, with the air deflecting blades being in a position so as to extend substantially parallel to the nozzle axis.
Figure 2:
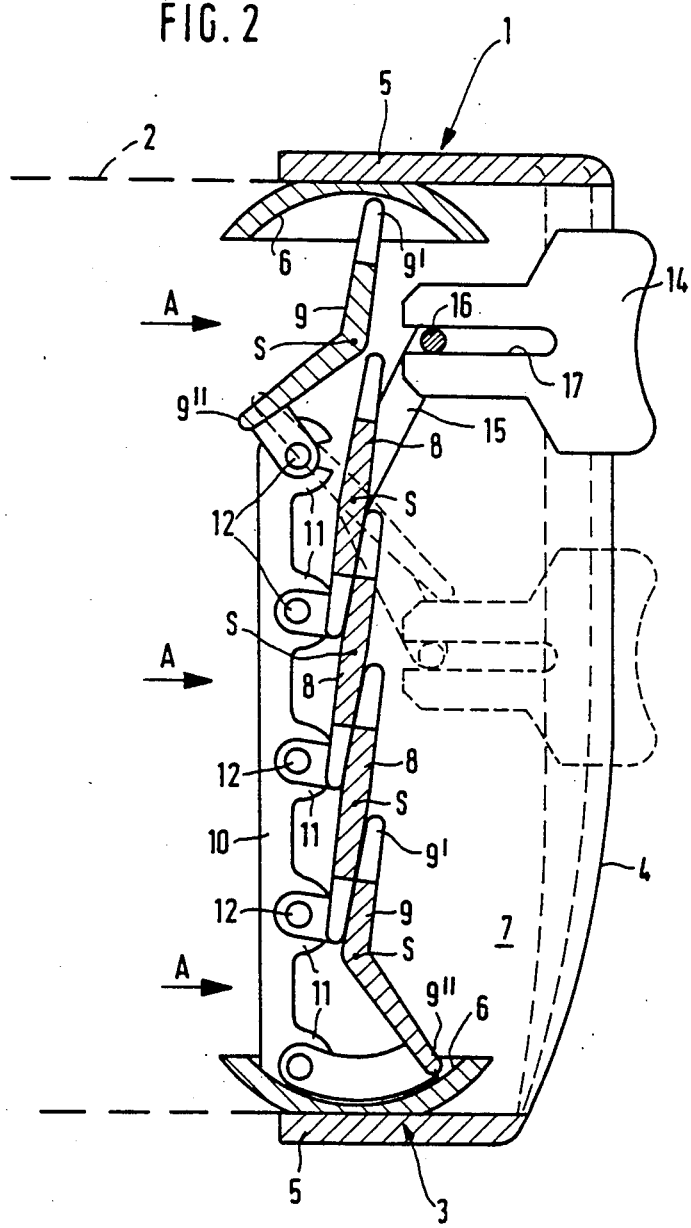
FIG. 2 is an axial section according to FIG. 1, but with the air deflecting blades being adjusted into a position in which the nozzle opening is blocked.

An air discharge nozzle 1 is illustrated in FIGS. 1 and 2 wherein a frame-like housing 3 is arranged outside of an air inlet conduit 2. The housing 3, which is actually an extension of the air inlet conduit 2, has two open ends, so that the air coming from the conduit 2 is permitted to travel through the housing 3 and to the inside of a motor vehicle, or the like. The cross section of the housing 3, as viewed in the direction of air flow A, may be of rectangular configuration.

The edges 4 on the outlet side of the housing 3 are appropriately shaped so as to conform to the particular shape of the member, e.g. a dashboard of a motor vehicle, into which the air discharge nozzle is installed.

The mutually opposed sidewalls 5 of the housing 3 have wall portions 6 arranged thereon and, as apparent from FIGS. 1 and 2, the sides of the wall portion 6 confronting each other are of an arcuate concave profile.

The housing walls 7 extending perpendicularly to the sidewalls 5 have mounted thereon, respectively, air deflecting blades 8 and 9 that are adapted for pivoting movement about axes S arranged vertically with respect to the plane of projection. The arrangement is such that the pivoting axes S are all disposed in the same plane, and the pivoting axes S of the outer air deflecting blades 9 coincide with the centers of the circular arcs formed by the respective wall portions 6.

The inner air deflecting blades 8 are substantially flat members and, as illustrated in the drawings, may have an airfoil or torpedo-like profile configuration.

Like the inner air deflecting blades 8, the outer air deflecting blades 9 are thin-walled members, and their outer sides may be of a similar bow-shaped configuration. However, rather than being flat, the outer air deflecting blades 9 are of an angular profile configuration, and the webs 9' and 9" of the outer air deflecting blades form on the side facing away from the inner air deflecting blades 8 an obtuse angle. The webs 9' and 9", which extend radially of the pivot axis S of the associated air deflecting blade 9, are of a length that corresponds substantially to the radius of the arc formed by the respective adjacent wall portion 6. This arrangement enables the free ends of the webs 9', 9", upon pivoting movement of the outer air deflecting blades 9, to cooperate with the wall portions 6 and act as sealing edges.

The air deflecting blades 8 and 9 are connected to a common drive means, the arrangement being such that the blades 8 and 9 are caused to pivot in unison, with the inner blades 8 and the webs 9' of the outer blades 9 always being parallel to one another. The blades 8 and 9 are coupled to one another by a drive rod 10 that is articulated to the blades 8 and 9 at a distance from their pivot axes S. The drive rod 10 is provided with articulating eyes 11, with the number of these eyes corresponding to the number of the air deflecting blades 8 and 9. The articulating eyes 11 are formed by respective pairs of projecting portions formed on one side of the drive rod 10, with each pair of projecting portions having arranged therebetween a circular opening for receiving pivot pins 12. The free ends of the projecting portions form a V-shaped mount 11' that facilitates insertion of the pivot pins 12 into the circular recesses in that the mouth 11' enables the extending portions to be elastically spread apart. Each of the pivot pins 2 is arranged between a pair of shackle member 13 that, in turn, are disposed in the area of the forward edges, as viewed in the flow direction A, of the air deflecting blades 8 and 9. The shackle members 13 are arranged and dimensioned so that each of the pivot pins 12 comes to lie on the same side of the planes that are formed by the inner air deflecting blades 8 and the webs 9' of the outer air deflecting blades 9, and so that they are spaced at equal distances from such planes and from the pivot axes S. This arrangement provides jam-free coupling of the air deflecting blades 8 and 9 by the coupling rod 10.

A manual control is provided for adjusting the air deflecting blades 8 and 9 and is in the form of a sliding member 14 that is mounted (in a conventional manner not illustrated in the drawings) for sliding movement on the housing 3 and is adapted for displacement from the upper position illustrated in FIG. 2 through a mid-position shown in FIG. 1 into a lower position illustrated in broken lines in Figure 2. To provide a drive link between the sliding member 14 and the air deflecting blades 8 and 9, a lever means 15 is attached to one of the inner air deflecting blades 8 at an angle relative to the plane of the blades. The lever means is comprised of a pair of arms which are connected at their free ends in a U-shaped manner by a pin 16. The sliding member 14 is provided with a slot 17 that is open at one end serves as a means to enable sliding movement of the pin 16 in the sliding member 14 in a direction perpendicularly thereof.

In the position of the sliding member 14 illustrated in FIG. 1, the inner air deflecting blades 8 and the webs 9' of the outer air deflecting blades 9 are pointed in a direction that is parallel to the air input direction A, so that the direction of air flow will remain unchanged. Movement of the sliding member 14 in one or the other direction causes the air deflecting blades 8 and 9 to be adjusted into different angular positions with respect to the direction of air flow A, so that the air exiting from the nozzle 1 can be directed into different directions. In the upper position of the sliding member 14, as illustrated in FIG. 2, the air deflecting blades assume a closing position in which the cross-sectional area of the housing 3 available for the flow of air is blocked. i.e. the output side of the air supply conduit is closed.

An essential feature of the invention is that, for all practical purposes, the air is permitted to travel between any two adjacent air deflecting blades 8 or 9, but not between the outer air deflecting blades and the adjacent fixed sidewalls 5. Depending on the position of the outer air deflecting blades 9, one or the other web 9' or 9" acts as a sealing member and cooperates with the adjacent wall portion 6 so as to block those portions of the nozzle cross section that are disposed on the side of the outer air deflecting blades 9 facing away from the inner air deflecting blades 8. The reason that it is desirable to block the air in these portions of the nozzle cross section is that proper directional control of the marginal air currents, which would otherwise be present on the outer side of the outer air deflecting blades 9, is difficult to achieve. Such non-directed marginal air currents, if allowed to exist, will cause the air traveling through two respective adjacent air deflecting blades 8 and 9 to be diverted from the desired path corresponding to the particular adjustment position of the air deflecting blades 8 and 9.

Since the webs 9" of the outer air deflecting blades 9, which are disposed upstream of the air current, form a V-shaped or funnel-like pattern in opposition to the direction of air flow A, the air traveling between one of the outer air deflecting blade 9 and the adjacent air deflecting blade 8 is accelerated. This improves the effectiveness of the air deflecting blades, since any non-directed portions of the air current that may be present due to leakages between the outer air deflecting blades 9 and the wall portion will hardly be able to divert the air traveling between the blades 8 or 9 from its desired path.

Another advantage of the illustrated arrangement is that the cross-sectional area E made available by the air deflecting blades 8 and 9 remains substantially unchanged even if the air flowing into the nozzle is redirected by 45° through adjustment of the air deflecting blades 8 and 9, i.e. the air volume and air velocity remain substantially constant regardless of the position of the air deflecting blades 8 and 9. This is in sharp contrast to the prior art air discharge nozzle in which the air is permitted to travel through those portions of the nozzle cross section which are disposed between the outer air deflecting blades and the adjacent fixed wall portions, for one must realize that when the air deflecting blades are adjusted into different positions, the size of these portions of the nozzle is changed considerably, because the adjacent fixed wall portions are unable to follow the pivoting movement of the outer air deflecting blades.

Figure 3:
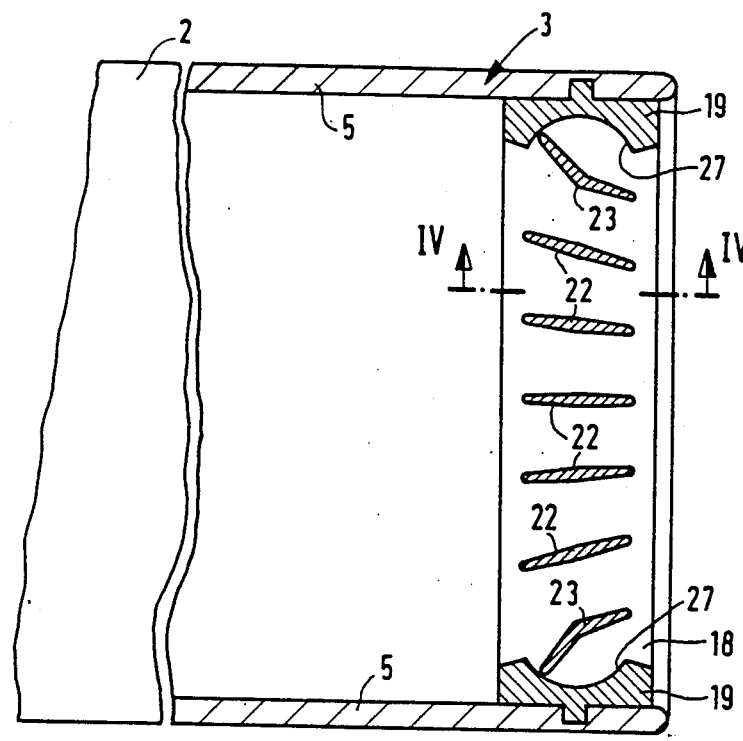
FIG. 3 is an axial section of another embodiment in which the air deflecting blades are arranged in a rotatable body.
Figure 4:
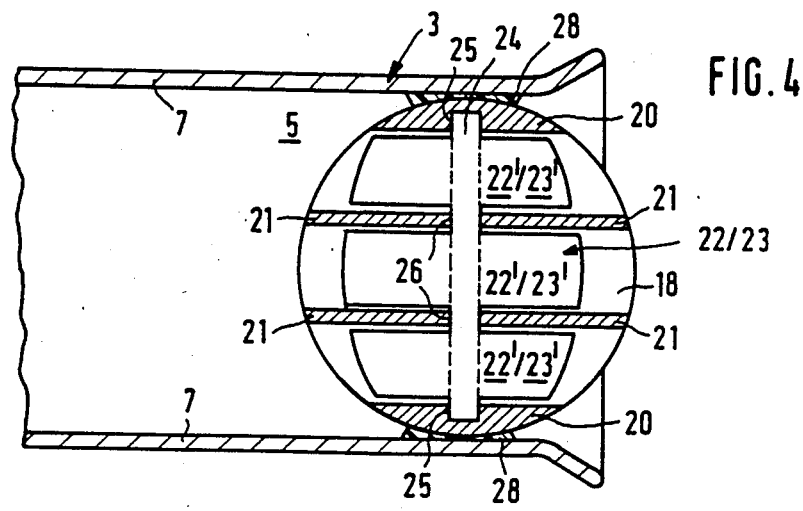
FIG. 4 is a section along line 4—4 of FIG. 3.

In the embodiment illustrated in FIGS. 3 and 4, a drum-shaped rotatable body 18, that is accommodated in the housing 3 of the air discharge nozzle 1, is mounted for pivoting movement on the sidewalls 5 of the housing 3. The axial length of the rotatable body 18 corresponds to the distance between the walls 5, whereas the diameter of the rotatable body 18 corresponds to about the distance between the outer housing walls 7.

The rotatable body is comprised, basically, of a pair of disk-like end portions 19 that are interconnected on diametrically opposed peripheral portions by a pair of wall portions 20. The wall portions 20 have flat surfaces that are spaced apart in confronting relationship, and their outer sides are of arcuate configuration to conform to the drum-like configuration of the rotatable body 18. Furthermore, fixed air conducting blades 21 are arranged between the end portions 19 and parallel to the mutually confronting flat surfaces of the wall portions 20. The fixed air conducting blades 21 have arranged perpendicularly thereof pivotable air deflecting blades 22 and 23, that are comprised, respectively, of sections 22' and 23' that extend between a pair of fixed air conducting blades 21 and between a fixed air conducting blade and a wall portion 20. The sections 22' and 23' are non-rotatably interconnected by a shaft 24 that has its ends mounted in cylindrical cavities 25 provided in the wall portions 20, and is supported intermediate thereof in circular apertures 26 provided in the fixed air conducting blades 21. Instead of the circular apertures 26, the fixed air conducting blades 21 may also be provided with a slot which extends axially of the rotatable body 18 and just serves as a means to accommodate rather than support the shaft 24.

Like in the former embodiment, the air deflecting blades 22 and 23 are interconnected by a common drive means so that the blades pivot in unison when being adjusted. Furthermore, like in the former embodiment, the outer air deflecting blades 23 are of angular or bow-shaped profile configuration (as viewed in the direction of shaft 24), the arrangement being such that both the upstream and downstream edges of the air deflecting blades 23 are able to cooperate, in the form of sealing elements, with an arcuate wall portion 27 on the confronting sides of the end portions 19 so as to prevent the air from traveling between the outer air deflecting blades 23 and the respective adjacent end portions 19.

Unlike the air deflecting blades 8 and 9 illustrated in FIGS. 1 and 2, the air deflecting blades 22 and 23 in FIGS. 3 and 4 are arranged in a funnel-like pattern, the arrangement being such that the air conduits in the rotatable body 18, that are defined by respective pairs of air deflecting blades 22 or 23, taper radially inwardly. This funnel-like pattern of adjacent air deflecting blades 22 and 23 is retained even when the blades are pivoted about the shaft 24.

When the rotatable body 18 and the air deflecting blades 22 and 23 assume the position illustrated in FIGS. 3 and 4, the air entering through the air input conduit 2 is permitted to travel unimpeded through the rotatable body 18 without any change in the direction of flow. Since the cross-sectional area between any two adjacent air deflecting blades 22 or 23 tapers inwardly in the direction of air flow, the air velocity is greater on the outlet side than on the inlet side. Furthermore, a more defined, focused air discharge current is produced, because the conduits formed between respective pairs of air deflecting blades 22 and 23 are focused towards a common center, as apparent from FIG. 3.

This focused air discharge current may be directed towards the right or left through adjustment of the air discharge blades 22 and 23 in FIG. 3, and upwardly or downwardly through pivoting of the rotatable body 18 in FIG. 4.

Furthermore, the rotatable body 18 can be pivoted by about 180° so that the cross-sectional area of the conduits extending between two respective air deflecting blades 22 or 23 enlarges radially in the direction of air flow. As a result, the air flow velocity will be lower on the outlet side than on the inlet side, and the discharge current will be divergent.

The discharge nozzle 1 according to FIGS. 3 and and 4 can be used for ventilating as well as for air conditioning systems. In ventilating systems, the temperature of the input air corresponds to that of the ambient temperature. To produce a cooling effect, the velocity of the air exiting from the nozzle must be relatively high, i.e. a high-velocity air current and a relatively narrow flow cross section is needed. This is accomplished by adjusting the rotatable body so as to assume a position in which the cross sectional area between the blades 22 or 23 radially diminishes in the direction of air flow. However, in an air conditioning system in which the air discharge temperature is about 6° to 12° C, the air discharge pattern must be relatively broad, since a concentrated air current at that temperature could feel uncomfortable. To change the pattern of the air discharge current from a converging into a diverging patten, the rotatable body need only be turned by 180°.

If the rotatable body 18 is turned from the position illustrated in FIG. 4 by 90°, the discharge nozzle 1 may be blocked, since the front and rear edges of the blades 21, that extend up to the periphery of the drum-shaped rotatable body 18, do at least partially cooperate with the sealing strips 28, or the like, which have the dual function of retaining the rotatable body in its respective position by way of frictional engagement and preventing the air from passing between the wall of housing 3 and the rotatable body 18.

Unlike the arrangements described in the foregoing, the passage of air between the outer air deflecting blades 9 or 23 and the adjacent walls of housing 3 or the rotatable body 18 can also be prevented by filling the space mentioned above with elastic padding material, or by arranging barrel-like segments on the outside of the outer air deflecting blades 9 or 23 drum which, regardless of the pivoting positions of the outer air deflecting blades 9 or 23, will engage the adjacent wall portions 6 or 27. Furthermore, the pivoting axes S and 24 of the air deflecting blades 8, 9, 22 and 23, rather than being arranged in the center, as illustrated in the drawings, may also be arranged off-center, as for instance in the region of the front or rear edges, as related to the direction of air flow A, of the air deflecting blades.

The above described embodiments are thus illustrative of the invention which may be modified within the scope of the appended claims.

The embodiments of the invention in which an exclusive property or privilage is claimed are defined as follows:

1. A discharge nozzle for an air delivery system such as a ventilating and air conditioning system in a motor vehicle wherein the nozzle has louver-like directional strips arranged adjacent to each other in an air flow opening so that there are two outer strips outward of the other strips and each said strip is pivotable about a pivot axis extending approximately perpendicularly to the direction of flow, and wherein all of said strips are coupled together to orient the emergent air flow in different directions relative to the axis of the opening, according to their pivot position, characterized by said outer strips having outwardly facing sides facing away from said other strips essentially independently of the pivot position of said outer strips, blocking means for blocking partial cross sections of the opening on said outwardly facing sides, wall portions of arcuate profile disposed on relatively fixed walls opposite said outwardly facing sides of said outer strips with the center of the arc coinciding with the pivot axis of the adjacent said outer strip, and a sealing member extending as far as the adjacent wall portion disposed on each of said outer strips.

2. A discharge nozzle according to claim 1, further characterized by said outer strips having inwardly facing sides facing towards each other and having an arcuate profile in an axial view thereof, such that a funnel is formed with a region of approximately constant cross section adjoining a tapered end thereof.

3. A discharge nozzle according to claim 1, further characterized by said strips being arranged at an angle to each other, such that the open cross section between every two strips increases or decreases in the direction of flow.

4. A discharge nozzle according to claim 1, further characterized by fixed strips arranged perpendicularly to the pivot axes of said pivotable strips.

5. A discharge nozzle according to claim 4, further characterized by each said pivotable strip consisting of several sections which are connected by a pivot shaft and which are in each case disposed in one of the partial regions into which the cross section of the opening is divided by said fixed strips.

6. A discharge nozzle according to claim 5, further characterized by said pivot shaft passing through an opening in said fixed strips.

7. A discharge nozzle according to claim 6, further characterized by said strips being disposed in a rotatable body with its axis of rotation extending perpendicularly to the direction of flow, so that when said outer strips are arranged at least partially in a funnel shape, there is produced a divergent or convergent discharge current, depending on whether the wider or narrower end of the funnel points in the direction of flow.

8. A discharge nozzle according to claim 7, further characterized by said rotatable body having a cylindrical shape with two cylindrical end portions connected to each other by radially opposed end wall portions in the region of the circumference of the cylinder, in the manner of a frame in whose opening are disposed the strips.

9. A discharge nozzle according to claim 8, further characterized by said pivotable strips being mounted pivotably on said end wall portions.

10. A discharge nozzle according to claim 9, further characterized by the axis of rotation of said rotatable body being arranged approximately perpendicularly to the pivot axes of said pivotable strips.

11. A discharge nozzle for an air delivery system such as a ventilating and air conditioning system in a motor vehicle wherein the nozzle has louver-like directional strips arranged adjacent to each other in an air flow opening so that there are two outer strips outward of the other strips and each said strip is pivotable about a pivot axis extending approximately perpendicularly to the direction of flow, and wherein all of said strips are coupled together to orient the emergent air flow in different directions relative to the axis of the opening, according to their pivot position, characterized by said outer strips having outwardly facing sides facing away from said outer strips essentially independently of the pivot position of said outer strips, blocking means for blocking partial cross sections of the opening on said outwardly facing sides, wall portions of arcuate profile disposed on relatively fixed walls opposite said outwardly facing sides of said outer strips with the center of the arc coinciding with the pivot axis of the adjacent said outer strip, a sealing member extending as far as the adjacent wall portion disposed on each of said outer strips, and each said outer strip consisting essentially of two web portions that are joined into an arcuate shape in the region of the pivot axis of the strip so as to form a profile that opens towards the adjacent wall region at an obtuse angle, and which have outer edges adapted to the shape and spacing of said wall portions such that, according to the pivot position of the outer strip, at least one of the webs coacts as said sealing member with the associated wall portion.

* * * * *